US009866584B2

(12) United States Patent
Capalik

(10) Patent No.: US 9,866,584 B2
(45) Date of Patent: *Jan. 9, 2018

(54) SYSTEM AND METHOD FOR ANALYZING UNAUTHORIZED INTRUSION INTO A COMPUTER NETWORK

(71) Applicant: CounterTack, Inc., Santa Monica, CA (US)

(72) Inventor: Alen Capalik, Pacific Palisades, CA (US)

(73) Assignee: CounterTack, Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/542,376

(22) Filed: Nov. 14, 2014

(65) Prior Publication Data
US 2015/0074811 A1    Mar. 12, 2015

Related U.S. Application Data

(63) Continuation of application No. 11/788,795, filed on Apr. 20, 2007, now abandoned, which is a
(Continued)

(51) Int. Cl.
H04L 29/06    (2006.01)
G06F 21/55    (2013.01)
(Continued)

(52) U.S. Cl.
CPC ........ *H04L 63/145* (2013.01); *G06F 9/45533* (2013.01); *G06F 21/552* (2013.01);
(Continued)

(58) Field of Classification Search
CPC .................. H04L 63/145; H04L 63/1491
See application file for complete search history.

(56) References Cited

U.S. PATENT DOCUMENTS 5,339,426 A    8/1994  Aoshima
5,621,886 A    4/1997  Alpert et al.
(Continued)

FOREIGN PATENT DOCUMENTS

JP    2005-316779       11/2005
WO    WO 2006/113781 A1  10/2006
WO    WO 2007/027739     3/2007

OTHER PUBLICATIONS

Asrigo, Using VMM-Based Sensors to Monitor Honeypots, Jun. 14, 2006, 11 pgs.
(Continued)

*Primary Examiner* — Oleg Korsak
*Assistant Examiner* — Simon Kanaan
(74) *Attorney, Agent, or Firm* — Morgan, Lewis & Bockius LLP

(57) ABSTRACT

The method analyzes unauthorized intrusion into a computer network. Access is allowed to a virtualized operating system running on a hypervisor operating system hosted on a network device. A network attack is intercepted on the virtualized operating system using an introspection module with a virtual-machine-based rootkit module and its associated userland processes running on the hypervisor operating system. The network attack includes attack-identifying information. Forensic data is generated on the network attack from the attack-identifying information.

9 Claims, 5 Drawing Sheets

Related U.S. Application Data continuation-in-part of application No. 11/488,743, filed on Jul. 17, 2006, now Pat. No. 8,429,746.

(60) Provisional application No. 60/802,543, filed on May 22, 2006.

(51) Int. Cl.
    *G06F 21/56* (2013.01)
    *G06F 9/455* (2006.01)

(52) U.S. Cl.
    CPC ........ *G06F 21/566* (2013.01); *H04L 63/1408* (2013.01); *H04L 63/1416* (2013.01); *H04L 63/1491* (2013.01); *G06F 2221/2123* (2013.01)

(56) References Cited

U.S. PATENT DOCUMENTS

| | | |
|---|---|---|
| 5,664,159 A | 9/1997 | Richter et al. |
| 5,740,413 A | 4/1998 | Alpert et al. |
| 6,009,274 A | 12/1999 | Fletcher et al. |
| 6,279,113 B1 | 8/2001 | Vaidya |
| 6,343,280 B2 | 1/2002 | Clark |
| 6,360,327 B1 | 3/2002 | Hobson |
| 6,446,062 B1 | 9/2002 | Levine et al. |
| 7,222,366 B2 | 5/2007 | Bruton, III et al. |
| 7,392,543 B2 | 6/2008 | Szor |
| 7,464,407 B2 | 12/2008 | Nakae et al. |
| 7,581,219 B2 | 8/2009 | Neiger et al. |
| 7,596,654 B1 | 9/2009 | Wong |
| 7,996,836 B1 | 8/2011 | McCorkendale et al. |
| 8,365,180 B2 | 1/2013 | Kawasaki et al. |
| 8,448,170 B2 | 5/2013 | Wipfel et al. |
| 8,539,582 B1 | 9/2013 | Aziz et al. |
| 8,572,613 B1 | 10/2013 | Brandwine |
| 8,683,548 B1 | 3/2014 | Curry et al. |
| 8,776,050 B2 | 7/2014 | Plouffe et al. |
| 8,943,506 B2 | 1/2015 | Tang et al. |
| 8,949,826 B2 | 2/2015 | Fitzgerald et al. |
| 2001/0011254 A1 | 8/2001 | Clark |
| 2002/0099752 A1 | 7/2002 | Markos et al. |
| 2002/0166063 A1 | 11/2002 | Lachman, III et al. |
| 2002/0194437 A1 | 12/2002 | Kapoor et al. |
| 2003/0023656 A1 | 1/2003 | Hutchison et al. |
| 2003/0120935 A1 | 6/2003 | Teal et al. |
| 2004/0025052 A1 | 2/2004 | Dickenson |
| 2004/0153672 A1 | 8/2004 | Watt et al. |
| 2004/0177269 A1 | 9/2004 | Belnet et al. |
| 2004/0225877 A1 | 11/2004 | Huang |
| 2005/0229250 A1 | 10/2005 | Ring et al. |
| 2006/0018466 A1 | 1/2006 | Adelstein et al. |
| 2006/0031673 A1 | 2/2006 | Beck et al. |
| 2006/0101516 A1* | 5/2006 | Sudaharan .......... H04L 63/0263 726/23 |
| 2006/0136720 A1 | 6/2006 | Armstrong et al. |
| 2006/0242703 A1 | 10/2006 | Abeni |
| 2006/0288414 A1 | 12/2006 | Kuroda |
| 2006/0294592 A1 | 12/2006 | Polyakov et al. |
| 2007/0002689 A1 | 1/2007 | Mateescu et al. |
| 2007/0101431 A1 | 5/2007 | Clift et al. |
| 2007/0180450 A1 | 8/2007 | Croft et al. |
| 2007/0180529 A1 | 8/2007 | Costea et al. |
| 2007/0240221 A1 | 10/2007 | Tuvell et al. |
| 2007/0250930 A1 | 10/2007 | Aziz et al. |
| 2008/0005782 A1 | 1/2008 | Aziz |
| 2008/0016571 A1* | 1/2008 | Chang .............................. 726/24 |
| 2008/0127114 A1 | 5/2008 | Vasudevan |
| 2008/0177994 A1 | 7/2008 | Mayer |
| 2008/0222729 A1 | 9/2008 | Chen et al. |
| 2008/0320594 A1 | 12/2008 | Jiang |
| 2009/0307273 A1 | 12/2009 | Johnson et al. |
| 2010/0042632 A1 | 2/2010 | Johnson et al. |
| 2010/0095281 A1 | 4/2010 | Raber |
| 2010/0153693 A1 | 6/2010 | Stall et al. |
| 2010/0306179 A1 | 12/2010 | Lim |
| 2011/0060947 A1 | 3/2011 | Song et al. |
| 2011/0179136 A1 | 7/2011 | Twitchell |
| 2011/0239291 A1 | 9/2011 | Sotka |
| 2012/0167063 A1 | 6/2012 | Detwiler et al. |
| 2012/0174186 A1 | 7/2012 | Aziz et al. |
| 2012/0179904 A1 | 7/2012 | Dunn et al. |
| 2012/0255012 A1 | 10/2012 | Sallam |
| 2012/0255018 A1 | 10/2012 | Sallam |
| 2012/0331553 A1 | 12/2012 | Aziz et al. |
| 2013/0047257 A1 | 2/2013 | Aziz |
| 2013/0238785 A1 | 9/2013 | Hawk et al. |
| 2013/0254870 A1 | 9/2013 | Sotka |
| 2013/0304903 A1 | 11/2013 | Mick et al. |
| 2014/0026121 A1 | 1/2014 | Jackson et al. |
| 2014/0096131 A1 | 4/2014 | Sonneck et al. |
| 2014/0108635 A1 | 4/2014 | Khemani et al. |

OTHER PUBLICATIONS

Capalik, Examiner's Answer, U.S. Appl. No. 11/788,795, dated May 31, 2011, 19 pgs.
Capalik, Notice of Allowance, U.S. Appl. No. 11/488,743, dated Oct. 24, 2012, 9 pgs.
Capalik, Notice of Allowance, U.S. Appl. No. 13/759,335, dated Oct. 9, 2013, 10 pgs.
Capalik, Notice of Allowance, U.S. Appl. No. 13/163,590, dated May 1, 2014, 5 pgs.
Capalik, Office Action, U.S. Appl. No. 11/488,743, dated Aug. 4, 2010, 22 pgs.
Capalik, Office Action, U.S. Appl. No. 11/488,743, dated Feb. 16, 2010, 23 pgs.
Capalik, Office Action, U.S. Appl. No. 11/488,743, dated Jan. 18, 2011, 23 pgs.
Capalik, Office Action, U.S. Appl. No. 11/488,743, dated Jul. 30, 2009, 21 pgs.
Capalik, Final Office Action, U.S. Appl. No. 11/788,795, dated Aug. 14, 2014, 18 pgs.
Capalik, Office Action, U.S. Appl. No. 11/788,795, dated Dec. 1, 2010, 19 pgs.
Capalik, Office Action, U.S. Appl. No. 11/788,795, dated Jun. 9, 2010, 14 pgs.
Capalik, Office Action, U.S. Appl. No. 13/163,578, dated Nov. 1, 2013, 15 pgs.
Capalik, Final Office Action, U.S. Appl. No. 13/163,590, dated Aug. 15, 2014, 11 pgs.
Capalik, Office Action, U.S. Appl. No. 13/163,590, dated Oct. 25, 2013, 11 pgs.
Capalik, Office Action, U.S. Appl. No. 13/759,335, dated Jun. 14, 2013, 32 pgs.
Debug Register, Aus Lowlevel, Mar. 22, 2010, 2 pgs.
European Network of Affined Honeypots, D1.2: Attack Detection and Signature Generation, May 11, 2006.
Anonymous, Wikipedia, "Honeypot (Computing)" http://en.wikipedia.org/wiki/Honeypot Jul. 17, 2006, 4 pgs.
Anonymous, Wikipedia, "Intrusion-Detection System" http://en.wikipedia.org/wiki/Intrusion_detection_system Jul. 17, 2006, 3 pgs.
International Search Report, PCTUS2008/060336, dated Aug. 11, 2008, pgs.
Joshi, Detecting Past and Present Intrusions Through Vulnerability Specific Predicates, SOSP'05, Brighton, UK, Oct. 23-26, 2005, 14 pgs.
Krapf, XEN memory management, Oct. 30, 2007, 5 pgs.
Liang, Fast and Automated Generation of Attach Signatures: A Basis for Building Self-Protecting Servers, Nov. 7-11, 2005.
Litty, Hypervisor support for identifying covertly executing binaries, Dec. 31, 2008, 16 pgs.
NeuralIQ Inc., Decision to Grant a Patent, JP 2010-504185, Jul. 26, 2013, 1 pg.
NeuralIQ Inc., Extended European Search Report, 08745858-4, dated Jun. 12, 2014, 4 pgs.
NeuralIQ Inc., International Search Report / Written Opinion, PCT/US2011/041119, dated Oct. 4, 2011, 12 pgs.

(56) References Cited

OTHER PUBLICATIONS

NeuralIQ Inc., International Search Report / Written Opinion, PCT/US2011/041122, dated Sep. 21, 2011, 12 pgs.
NeuralIQ Inc., Notice of Reasons for Rejection, JP 2010-504185, dated Mar. 15, 2013, 4 pgs.
NeuralIQ Inc., Office Action, AU 2008242296, dated Apr. 5, 2012, 2 pgs.
NeuralIQ Inc., Office Action, CA 2,689,126, dated Aug. 15, 2012, 3 pgs.
NeuralIQ Inc., Office Action, CA 2,689,126, dated Jan. 23, 2014, 3 pgs.
NeuralIQ Inc., Patent Examination Report No. 1, AU 2011271157, dated Dec. 16, 2013, 4 pgs.
Provos, A Virtual Honeypot Framework, Oct. 21, 2003, 11 pgs.
Shibuya, A study for some experiences of the Operation of Highly Interactive Decoy System, Aug. 10, 2004, 10 pgs.
Tian, A Study of Intrusion Signature Based on Honeypot, Parallel and Distributed Computing, Applications and Technologies, PDCAT'2005, Dec. 8, 2005, pp. 125-129.
Zhang, Honeypot: a supplemented active defense system for network security, Parallel and Distributed Computing, Applications and Technologies, PDCAT'2003, Aug. 29, 2003, pp. 231-235.
Capalik, Notice of Allowance, U.S. Appl. No. 13/163,590, dated Apr. 10, 2015, 5 pgs.
NeuralIq, Office Action, CA 2,689,126, dated Mar. 6, 2015, 3 pgs.
Capalik, Certificate of Grant, AU2011271157, dated Jan. 7, 2016, 1 pg.
CounterTack Inc., Certificate of Grant, EP08745858.4, dated Aug. 5, 2015, 1 pg.
CounterTack Inc., Extended European Search Report, EP15174670.8, dated Nov. 11, 2015, 4 pgS.
Dagon et al., "HoneyStat: Local Worm Detection Using Honeypots," Recent Advances in Intrusion Detection, Springer Berlin Heidelberg, 2004, 20 pgs.
NeuralIQ Inc., Examination Report, AU2011271157, dated Mar. 13, 2015, 4 pgs.
CounterTack Inc., International Search Report and Written Opinion, PCTUS2016/012533, dated Jun. 16, 2016, 12 pgs.
Capalik, Office Action, U.S. Appl. No. 14/823,916, dated Aug. 30, 2016, 13 pgs.
CounterTack Inc., Decision to Grant, EP15174670.8, dated Sep. 14, 2016, 5 pgs.
CounterTack Inc., Certificate of Grant, EP15174670.8, dated Sep. 14, 2016, 1 pg.
Capalik, Final Office Action, U.S. Appl. No. 14/823,916, dated Jun. 6, 2017, 15 pgs.
CounterTack Inc., Office Action, CA 2,689,126, 3 pgs.
CounterTack Inc., Communication Pursuant to Article 94(3), EP11729826.5, dated Jun. 22, 2017, 5 pgs.

* cited by examiner

Figure 3

When first run W32/Rbot-CBQ copies itself to <System>\msprexe.exe. ← 300

The following registry entries are created to run msprexe.exe on startup: ← 301

HKCU\Software\Microsoft\Windows\CurrentVersion\Run
Windows Management System
msprexe.exe HKLM\SOFTWARE\Microsoft\Windows\CurrentVersion\Run ← 302
Windows Management System
msprexe.exe HKLM\SOFTWARE\Microsoft\Windows\CurrentVersion\RunServices
Windows Management System
msprexe.exe Registry entries are set as follows:

HKLM\SOFTWARE\Microsoft\Ole
EnableDCOM
N

HKLM\SYSTEM\CurrentControlSet\Control\Lsa
restrictanonymous
1

Figure 4

```
<item type="STRING.TCP">                    ← 400
  <struct name="STRING.TCP">
    <var name="version" protected="true">4.0</var>
    <array name="signatures">
      <entry dontDelete="true" nda="false" sfr="85">
        <var name="SigName" default="RBOT.CBQ Worm Activity" protected="true" />
        <var name="SIGID" default="5571" protected="true" />
        <var name="SubSig" default="0" protected="true" />
        <var name="AlarmSeverity" default="high" />
        <var name="Enabled" default="True" />
        <var name="EventAction" default="alarm">alarm|reset</var>
        <var name="SigVersion" default="S185" />
        <var name="SigStringInfo" default="RBOT.CBQ" />
        <var name="AlarmThrottle" default="Summarize" />
        <var name="Direction" protected="true" default="ToService" />
        <var name="MinHits" default="1" />
        <var name="Protocol" default="TCP" />
        <var name="RegexString" protected="true"
default="\xb5\x71\xc4\x43\x1e\x34\xce\x3a\x18\x37\xef\xc3\x22\xa1\x20\x1f\x6c\x10\x8f\x6
8\x3d\xf4\xef\x51\x92\xf9\x4f\xbc\x46\xe9\x05\xdc" />
        <var name="ServicePorts" default="445" />
        <var name="StorageKey" default="STREAM" />
        <var name="SummaryKey" default="Axxx" />
        <var name="ThrottleInterval" default="15" />
      </entry>
    </array>
  </struct>
</item>
```

SYSTEM AND METHOD FOR ANALYZING UNAUTHORIZED INTRUSION INTO A COMPUTER NETWORK

This is a continuation application of U.S. patent application Ser. No. 11/788,795, filed Apr. 20, 2007, entitled "System and Method for Analyzing Unauthorized Intrusion into a Computer Network," which is a continuation-in-part application of U.S. patent application Ser. No. 11/488,743, filed on Jul. 17, 2006, entitled "Decoy Network Technology With Automatic Signature Generation for Intrusion Detection and Intrusion Prevention Systems," which is now U.S. Pat. No. 8,429,746, issued on Apr. 23, 2013, which claims the priority to U.S. Provisional Patent Application Ser. No. 60/802,543, filed May 22, 2006. The disclosure of U.S. patent application Ser. Nos. 11/788,795 and 11/488,743 is incorporated by reference herein in their entirety.

FIELD

The invention relates to the field of methods and systems for protecting computer networks and is more particularly, but not by way of limitation, directed to decoy network technology with automatic signature generation for intrusion detection and intrusion prevention systems.

BACKGROUND

Computer networks typically interface with the Internet or other public computer systems and are thus vulnerable to attacks, unwanted intrusions and unauthorized access. One threat to networks is the so-called zero-day attack that exploits security vulnerabilities unknown to the system operators.

Conventional network security systems include a firewall that generally prevents unauthorized access to the network or its computers. Conventional systems also include intrusion detection systems (IDS) and intrusion prevention systems (IPS) that typically contain a library of signatures of malware payloads, which enable them to detect those defined exploits attempting to access production systems. When a connection is attempted to a network port, the IDS or IPS examines the low-level IP data packets and compares them to its library of signatures for a match. When a match is identified the IDS or IPS provides notification of the match.

The problem lies in the static nature of the conventional IDS and IPS signatures coupled with the ability of determined attackers to launch new undefined or zero-day automated attacks to gain access to the network. While an intrusion prevention system (IPS) equipped with behavioral signatures providing the ability to capture behavioral patterns offers a higher level of protection, these have similar drawbacks in that behavioral signatures are still static in nature and limited in their ability to stop zero-day attacks.

Still another type of network security systems utilizes a honeynet arrangement to attract and then trap a suspected attacker. A honeynet is made up of two or more honeypots on a network. Such measures typically are made up of a computer, data or network site that appears to be part of the network and appears to be one or more valuable targets, but which is actually an isolated component located away from production networks. These are typically passive measures effective against spammers and other low-level attacks. Such systems typically run emulated operating systems and services and are generally not useful against sophisticated attackers who can detect and effectively avoid the honeynet, never unloading their zero-day attack or payload for the honeynet to capture and analyze. Also, if the conventional honeynet configuration is not sufficiently separated from the network system, an attacker can use the honeynet to gain access to the network. Examples of emulated or software based honeypots include "honeyd" which is a GPL licensed daemon that is utilized to simulate network structures. Another example of emulated software based honeypots include "mwcollect" and "nepenthes" which are also released under the GPL license and which are utilized to collect malware. The "mwcollect" and "nepenthes" packages extract information on obtaining the malware binaries from the exploit payload.

Because each of the problems and limitations discussed above exist in the prior art devices and systems, there is a need for methods and systems that adequately protect networks from new and undefined attacks and that allow for real-time updates to a network's library of attack signatures.

SUMMARY

One or more embodiments of the invention are directed to an improved method and system for protecting computer networks. In one embodiment, the invention comprises a modular decoy network appliance, which runs fully functional operating systems on client hardware modules. The modular arrangement comprises front-end fully functional operating system modules and a separate processing back-end module.

The front-end presents a standard fully functional operating system, such as Windows® or a flavor of Linux®, or Sun Microsystems Solaris® that returns a standard operating system fingerprint when it is scanned by tools that attackers typically use to identify vulnerable systems. The attacker is thus lured into accessing the identified operating system and running custom or known exploits on that system.

The front-end module includes a sentinel kernel driver (or a more generalized executable module) that is hidden from system scanners as it is removed from kernel module listings or registry in Windows. Thus, the kernel does not indicate the sentinel kernel driver is running. The sentinel kernel driver monitors connections to the operating system as well as activity on the operating system and activity on services running on the operating system. When an attacker connects to a port, the sentinel kernel driver captures the data coming through the socket. Generally all relevant data coming through the socket is captured. In most cases this means whatever data is received as part of an incoming attack is captured by the sentinel driver. Captured data is sent as a slew of common UDP packets to the back end processing module over the fabric network connection separate from the vulnerable front-end modules. In this manner, there is no way for the intruder to know that his or her communications with the operating system are being analyzed.

The captured data, which contains the attack-identifying information, is sent to the back-end or processing module though the backplane fabric of the appliance using Layer 2 Ethernet communication protocol. The processing module is separate and independent from the client operating system modules and communicates the processed information to security administrators through a network port connected to the private and secure VLAN. Unbeknownst to the intruder, the exploit is thus captured, transferred and analyzed.

With the received data, the processing module generates a report of the attack. The report consists of user-friendly information that paints a picture of the attack for a system administrator. This may include information on which sockets were accessed, what happened at a particular socket, the key strokes entered or bytes transferred to the port, what files were transferred, registry changes, how the attack was run, what happened on the primary network, on its servers or how the network services were affected. The report may also include information on the location of the attacker or the attacker's service provider. Graphical representations of key information and interactive mapping of the attack locales by region or country may be utilized in one or more embodiments of the invention.

The processing module is used to generate an attack signature by analyzing all the data passed through the socket. The signature is generated by analyzing the attack payload including the keystrokes or transferred bytes and any files uploaded to the client operating system of an ASCII or binary nature. The files uploaded are assumed to be of a malicious nature created to deliver a malicious payload in the form of a compiled program or an interpreted script. In the event that no malicious files are uploaded to the operating system, the signature generation engine analyzes all the keystrokes or bytes delivered through the socket and creates a pattern signature which when applied to an IDS or IPS system, enables the IDS or IPS systems to detect the attack if repeated on production systems. Once generated, the attack signatures can be viewed by a system administrator to determine the appropriate course of action. The system administrator can instruct the signature to be uploaded to the intrusion detection system (IDS) or intrusion prevention system (IPS) for the protected network where it is added to the IDS's or IPS's library of signatures to protect production systems. In one or more embodiments of the invention, the signature may be uploaded or saved in a third party system that maintains all known exploits. In this manner, other systems may be notified through secure channels of an impending threat. For example, by transferring the signature to a centralized server that communicates with multiple installations, the intruder may be thwarted before attacking other systems in other companies.

A production network's library of signatures can be updated in real-time as the attacker modifies its illicit activity or a new attack is launched. The embodiment can also maintain a database of any and all attack signatures generated. Other and further advantages will be disclosed and identified in the description and claims and will be apparent to persons skilled in the art.

Another embodiment provides a system and method for analyzing unauthorized intrusion into a computer network. Access is allowed through one or more open ports to one or more virtualized decoy operating systems running on a hypervisor operating system hosted on a decoy network device. This may be done by opening a port on one of the virtualized decoy operating systems. A network attack on the virtualized operating system is then intercepted by a virtual-machine-based rootkit module running on the hypervisor operating system. The attack-identifying information is communicated through a private network interface channel and stored on a database server as forensic data. A signature generation engine uses this forensic data to generate a signature of the attack. An intrusion prevention system then uses the attack signature to identify and prevent subsequent attacks

BRIEF DESCRIPTION OF THE DRAWINGS

FIG. 3 illustrates a human readable summary of an example attack;

FIG. 4 illustrates an XML formatted attack signature generated from the attack summarized in FIG. 3 for transmittal to an IDS or IPS.

DETAILED DESCRIPTION OF THE PREFERRED EMBODIMENT

The following descriptions of embodiments of the invention are exemplary, rather than limiting, and many variations and modifications are within the scope and spirit of the invention. Although numerous specific details are set forth in order to provide a thorough understanding of the present invention, it will be apparent to one of ordinary skill in the art, that embodiments of the invention may be practiced without these specific details. In other instances, well-known features have not been described in detail in order to avoid unnecessarily obscuring the present invention.

Figure 1:
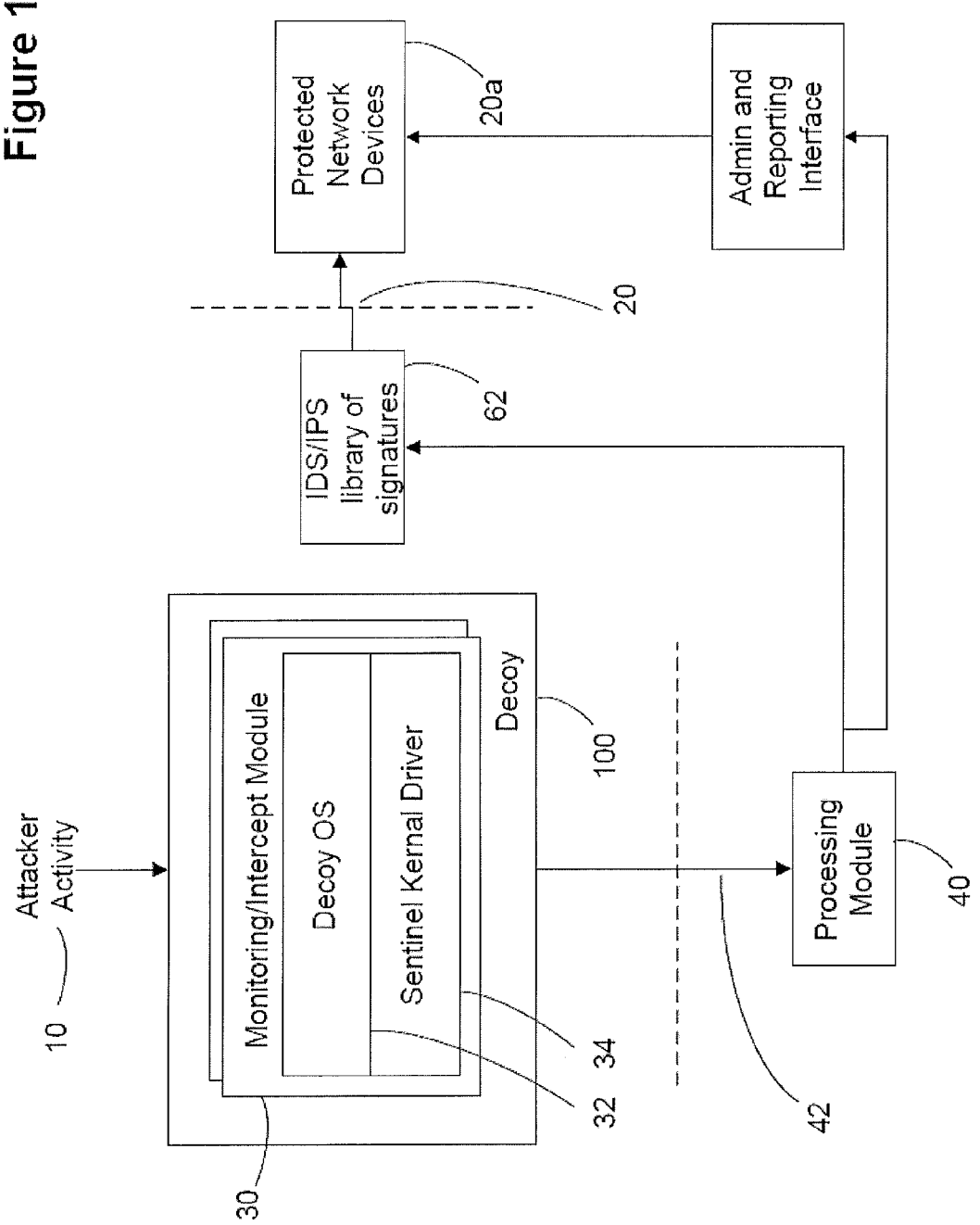
FIG. 1 illustrates a block diagram of an embodiment of the system.

One or more embodiments of the invention are directed to an improved method and system for protecting computer networks. One embodiment is illustrated in FIG. 1, which illustrates attacker activity 10 directed at protected computer network 20. As in a typical attack, attack 10 is scanning for an open port on computer network 20 in an attempt to make a connection and then access one or more protected network devices 20a on network 20.

Attack 10 is monitored by decoy 100 that includes at least one monitor/intercept module 30. Monitor/intercept module 30 comprises fully functioning decoy operating system 32 that monitors each of the access ports for network 20. Any operating system may be used as decoy operating system 32 including Windows®, Sun Microsystems Solaris® or any version of Linux® known to persons skilled in the art. All known operating systems are within the scope of the present invention. FIG. 1 shows one monitoring/intercept module 30 in the foreground, however any number of homogeneous or heterogeneous monitoring/intercept modules may be utilized (shown as a stack behind monitor/intercept module 30). For example, in one embodiment of the invention a Windows® monitoring/intercept module 30 and LINUX® monitoring/intercept module 30 may be employed. There is no limit to the number of monitoring/intercept modules that may be utilized in the system and other embodiments may employ homogeneous decoy operating systems 32 that are of the same or of different versions. Monitoring/intercept module 30 also includes sentinel kernel driver 34 which will be described in further detail below. Protected network devices 20a are accessed through IDS/IPS with Library of Signatures 62 in one or more embodiments of the invention. The system also includes processing module 40 for obtaining and analyzing exploits.

When attack 10 connects to an access port of network 20, the fully functional decoy operating system 32 intercepts the connection and returns a standard operating system fingerprint. For example when connecting to an address that does not exist on protected network 20, decoy 30 may be configured to respond to any such incorrect address since the connection is assumed to be malicious as there is no hardware on protected network 20 at that address. The response may be configured to utilize any existing hardware module having a given operating system and version within monitoring/intercept module 30. For example, an FTP port access for Windows® may return a particular character sequence that is different than an FTP response for LINUX®. An FTP access to a Windows® port for example may return a response ">ftp: connect: Connection refused". This characters sequence may be slightly different on LINUX® and hence allows the intruder to determine what type of operating system is at a particular network address. In addition, different versions of Windows® may respond with slightly different character sequences which allows the intruder to determine the specific version of the operating system or to determine a possible range of versions for the responding operating system. The instigator of attack 10 is thus lured into accessing decoy 100, which includes monitor/intercept module 30, and running custom or known exploits for the observed operating system. When attacker activity proceeds to interact with decoy 100, the attacker provides decoy 100 with the data used to obtain control of decoy 100, which is recorded and analyzed without knowledge of the attacker.

All scans by attack 10 receive real-world operating system information, thus leading the instigator of the attack 10 to believe that there is a potentially vulnerable system responding and thus luring attack 10 into communicating with monitor/intercept module 30. Since real hardware is utilized, the attacker is attacking an actual physical system and thus has no idea that the system is actually an instrumented honeypot that monitors the attackers every move.

Monitor/intercept module 30 includes sentinel kernel driver 34. In one embodiment, sentinel kernel driver 34 is a combination of custom root-kit code that on Windows® based operating systems removes pointers from Microsoft® client/server runtime server subsystem (CSRSS.exe). This coupled with removing sentinel kernel driver 34 from the Windows® registry effectively hides sentinel kernel driver 34 and all its drivers from attack 10. On Unix® based operating systems, the kernel pointers are removed making the kernel unable to link to a running process, effectively hiding sentinel kernel driver 34 and all its libraries from attack 10. Sentinel kernel driver 34 monitors all data coming through the socket and is derived from an open source code, such as libpcap, known to persons skilled in the art.

When an attacker connects to a port, and begins interacting with decoy operating system 32, sentinel 34 monitors and captures information from the connection including port numbers, data streams, keystrokes, file uploads and any other data transfers.

The captured information, or attack-identifying information, is then sent for processing to processing module 40 as illustrated in FIG. 1. Processing module 40 may optionally include a sentinel server that receives information from the sentinel kernel driver and deposits the information in a database for later analysis. In one embodiment, the monitor/intercept module 30 is a front-end module or series of modules and the captured data is sent to processing module 40 though the backplane of the appliance or appliances through a layer 2 Ethernet communications link not available to the attacker such as an IP connection or any other hardware dependent custom communication protocol known to persons skilled in the art. Processing module 40 is part of a secure and separate administrative network 42. In one or more embodiments the signature may be sent from the back end processing module 40 to IDS/IPS 62 through a second network connection which is used by the processing module 40 to directly interact with IDS/IPS 62. The sentinel kernel driver may utilize replay functionality to replay the attacks on the operating system in reverse to clean up the operating system to its pre-attack state. In this manner, the attack can be thwarted and the operating system thus does not become a tool of the hacker.

Figure 2:
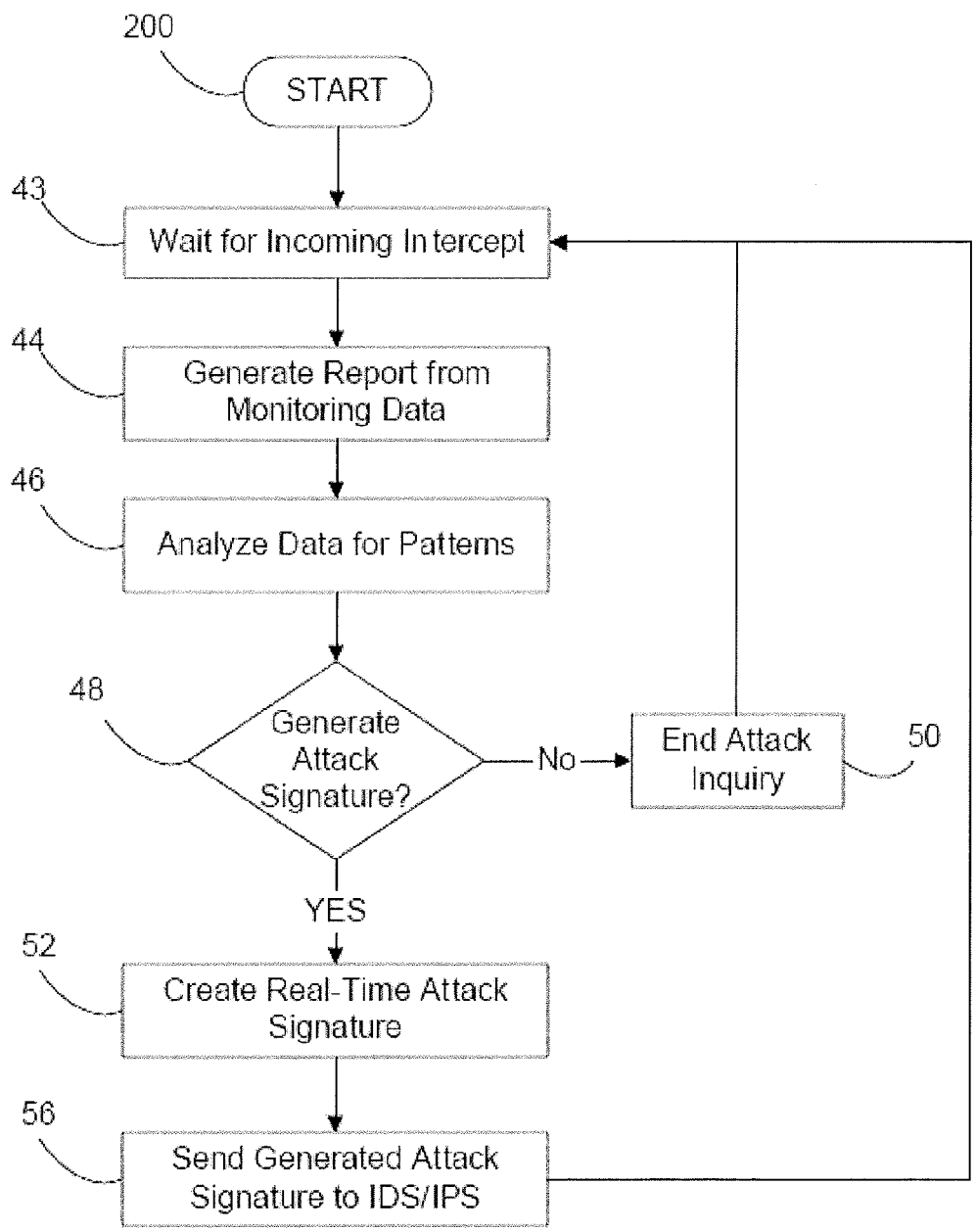
FIG. 2 illustrates a flow chart of an embodiment of the processing that occurs on processing module 40.

As shown in FIG. 2, processing starts at 200 and waits for activity from sentinel kernel driver 34 at step 43. In step 44, processing module 40 generates a report of the attack that includes attack-identifying information (See FIG. 3). This report is for the use and review by a system administrator who is responsible for administering protected network 20. The attack may contain one or more data transfers or keystrokes for example, which are analyzed at step 46. By observing whether the attacker is successful in interacting with the system, i.e., if the system is responding in a manner that shows that the attacker has gained access, then determination whether to generate an attack signature is made at step 48 and the attack signature is generated at step 52 (See FIG. 4). If the attacker for example is unsuccessful at gaining access or if there is no data transfer for example, then the attack inquiry may be ended at step 50. Any generated attack signature is sent to the IDS/IPS at step 56 and processing continues at step 43.

In one embodiment of the invention, the report is written, and is displayed in an web-based visualization interface and can include information about which sockets were accessed by attack 10, what happened at a particular socket, the key strokes entered or data transferred, what files were transferred, how the attack 10 was run, what happened on monitor/intercept module 30 and how decoy operating system 32 and any related network services were affected. The report may also include information on the location of the instigator of attack 10 or the service provider used for attack 10. Graphical representations of key information and interactive mapping of attack locales by region or country may also be included in the report.

In step 46, the attack-identifying information is analyzed for known attack patterns and non-standard patterns such as repeating binary patterns, keystroke patterns, downloaded daemons or errors such as buffer overflow attempts. By observing the operations performed on decoy operating system 32 the attack may be categorized and analyzed to determine for example how an attack gains control of decoy operating system 32. Any method of analyzing the incoming data such as binary matching, neural network matching or keyword matching or any other method of matching attack-identifying information is in keeping with the spirit of the invention.

In step 48, a decision is made as to whether to generate an attack signature. If no harmful operations occurred as a result of attack 10 or when no known attack patterns are found, then no further attack inquiry would be needed as shown in step 50. The processing module 40 can then take on the next input of captured information from the monitor/intercept module 30.

If a determination is made that attack signature generation is warranted, an attack signature is generated as illustrated in step 52. Processing module 40 may generate a signature whenever data is found to be transferred through the socket in one or more embodiments of the invention. Alternatively, if the attack signature already exists or if the data transfer is of a nature that indicates probing rather than attack, then the attack signature may not be generated. For example, processing module 40 may not generate a signature when it is found that no data has been transferred through the socket even though the socket may have been opened and closed without data transfer. Once the attack signature is generated, the signature can be reviewed by the system administrator who decides to send the attack signature, shown in step 56, to the intrusion detection system (IDS) or intrusion prevention system (IPS) for the protected network 20 through a standard network connection including a wireless connection that is generally not sent on protected network 20 or any other network that the attacker may observe. This is accomplished by applying the generated attack signature to the IDS/IPS library of signatures to update the information contained in the library of signatures to prevent the attacker from accessing the primary network with a zero-day attack.

Embodiments of step 56 may save the generated attack signatures in a database for future use or further analysis by system administrators. The signatures may also be sent to a proprietary global database of attack signatures for further analysis. Any IDS/IPS may be utilized in one or more embodiments of the invention. Existing IDS/IPS systems for example may be interfaced with in order to integrate with existing solutions.

FIG. 3 illustrates a human readable summary of an example attack. Line 300 shows that the file "msprexe.exe" is copied into the "System" directory. Line 301 shows a first registry entry created by the attack. Line 302 shows a second registry entry created by the attack. Any other changes to the system may be shown, as part of the attack-identifying information and the information shown in FIG. 3 is exemplary only.

FIG. 4 illustrates an XML formatted attack signature generated from the attack summarized in FIG. 3 for transmittal to an IDS or IPS. XML block 400 includes tags that define the attack signature in the format of the particular IDS or IPS. Any tags used by any IDS or IPS are in keeping with the spirit of the invention and the tags shown in FIG. 4 are exemplary only. For example any ports, protocols, severity levels, alarm levels, signature name or any other quantity may be utilized to inform an IDS or IPS of an attack signature.

Figure 5:
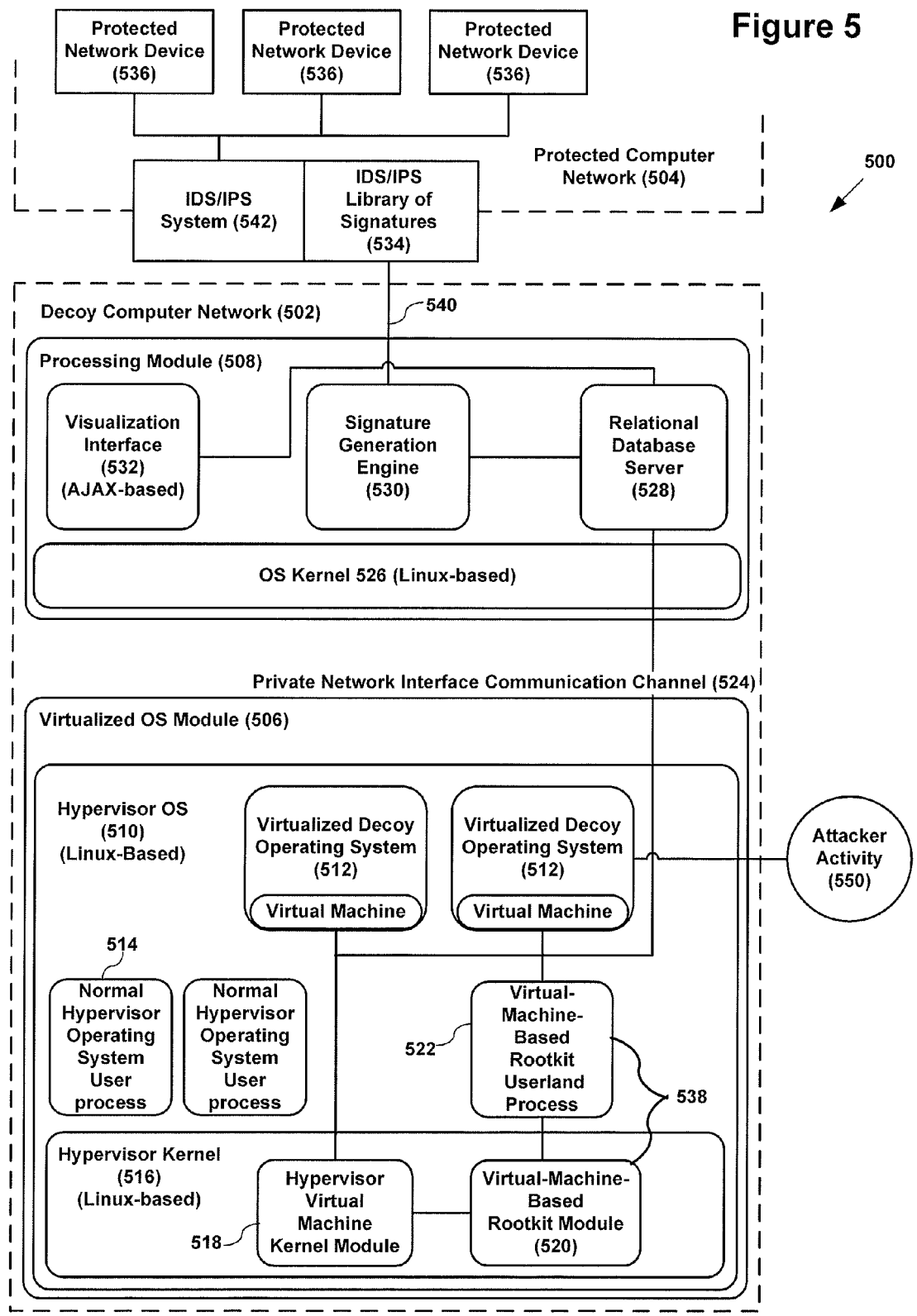
FIG. 5 illustrates a block diagram of another embodiment of the system.

Another embodiment of a system for analyzing and preventing unauthorized intrusion into a computer network is shown in FIG. 5. This embodiment is directed to an improved method and system for analyzing unauthorized intrusion into a decoy computer network, the analysis of which is used to prevent unauthorized access into a protected computer network. An embodiment of such a system is illustrated in FIG. 5, while the method remains as shown in the flowchart in FIG. 2 above.

The system 500, as shown in FIG. 5, includes a decoy computer network 502 and a protected computer network 504, each comprising one or more separate computing devices. The decoy computer network 502 includes a virtualized operating system module 506 for monitoring the decoy network 502, and a processing module 508 for obtaining, analyzing, and responding to exploits.

These modules may be hosted on the same computing device or on separate computing devices. However, for ease of explanation, these modules will be described below as being hosted on separate computing devices. Furthermore, although not shown, one skilled in the art will appreciate that each of these computing devices may include one or more processors, input/output devices, communication circuitry, power sources, memory (both physical, e.g., RAM, and disks, e.g., hard disk drives), and any other physical hardware necessary for hosting and running the aforementioned modules. In some embodiments, the modules 506 and 508 are as present in physical memory once the system has been booted and is operational.

The virtualized operating system module 506 includes a hypervisor operating system 510 (also known as a virtual machine monitor operating system) that provides a virtualization platform that allows multiple virtual operating systems to be run on a host computing device at the same time. In some embodiments, the hypervisor operating system 510 is a LINUX-based system. One or more fully-functioning "guest" virtualized operating systems 512 are run on the hypervisor operating system 510 at a level above the hardware. As will be described in detail below, these virtualized operating systems 512 act as decoy operating systems to attract attacker activity 550. Any operating system may be used as guest decoy operating system 512, including but not limited to WINDOWS, SUN MICROSYSTEMS, SOLARIS, or any version of LINUX known to persons skilled in the art, as well as any combination of the aforementioned. It should be appreciated that all known operating systems are within the scope of the present invention. There is also no limit to either the number of virtualized guest decoy operating systems 512 or the number of virtualized guest operating system modules 506 that may be utilized.

Also running on the hypervisor operating system 510 are normal hypervisor operating system userland processes 514. The hypervisor operating system 510 includes a hypervisor kernel 516, which in some embodiments is also Linux-based. The hypervisor kernel 516 is that part of the hypervisor operating system 510 that resides in physical memory at all times and provides the basic services to the hypervisor operating system 510. The hypervisor kernel 516 is the part of the operating system that activates the hardware directly or interfaces with another software layer that, in turn, drives the hardware. The virtualized decoy operating systems 512 access the physical memory assigned to them by the hypervisor operating system via the hypervisor kernel 516.

The hypervisor kernel 516 includes a hypervisor virtual machine kernel module 518 that supports virtualization of the "guest" decoy operating systems 512. The hypervisor kernel 516 also includes virtual-machine-based rootkit module 520 coupled to the hypervisor virtual machine kernel module 516. The virtual-machine-based rootkit module 520 is a set of software tools that conceal running processes, files or system data from the virtualized decoy operating systems 512. As described in further detail below, the virtual-machine-based rootkit module 520 is part of introspection module 538, which performs introspection into the physical memory segments assigned to each of the virtualized decoy operating systems 512.

Virtual-machine-based rootkit userland processes 522 run on top of the virtual-machine-based rootkit module 520. Together, the rootkit module 520 and its associated userland processes 522 constitute the system's introspection module 538 (described further below). Virtual-machine-based rootkit userland processes 522 also pass data from the introspection module 538 to the processing module 508.

In use, attacker activity 550 is directed at the decoy computer network 502 through one or more ports of each of the virtualized decoy operating systems 512 that are left open as a gateway for attacker activity 550. For example, the decoy network 502 can be configured to respond to connection attempts made at network addresses that do not exist on the protected network 504. Connections to these non-existent network addresses are assumed to be malicious, since no production hardware exists on the protected network 504 at these addresses. Decoys 512 (in the form of a virtualized operating system) may be configured to respond to any such non-existent network address. As in a typical attack, the attacker activity 550 scans for an open port, ostensibly in an attempt to make a network connection and then access one or more computing devices on the protected computer network 504. When the attacker activity 550 scans for open ports at non-existent network addresses, however, the attacker is presented with a virtualized decoy operating system 512 instead.

When the attacker activity 550 connects to a virtualized decoy operating system 512 through an open port, the attacker sees a fully-functional standard operating system fingerprint. Since the virtualized operating system module 506 can be configured to present any operating system as a fully-functional virtualized decoy 512, responses to connection requests from attacker activity 550 are guaranteed to be authentic for the operating system running on that decoy. For example, an FTP port access request for WINDOWS may return a specific character sequence that differs from an FTP response for LINUX. Similarly, an FTP access request to a WINDOWS port may return a response ">ftp: connect: Connection refused." This character sequence may be slightly different from that generated by LINUX. Further, different versions of WINDOWS may respond with slightly different, version-specific character sequences. Since attackers often use these sequences to identify what type of operating system is at a particular network address and the version (or range of possible versions) for that operating system, the fact that virtualized decoy operating systems 512 generate authentic responses makes them realistic decoys and encourages intruders to access them. The instigator of the attack 550 is thus lured into accessing the decoy 512, which is overseen by the hypervisor operating system 510 running on the hardware-based, virtualized operating system module 506. Attacker activity 550 may then initiate custom or known exploits for the observed operating system. When the attacker activity 550 proceeds to interact with the decoy 512, the attacker provides the decoy 512 with the data used to obtain control of the decoy 512. These data are recorded and analyzed without the knowledge of the attacker, as described further below.

All scans by the attacker activity 550 receive real-world operating system and service information, leading the instigator of the attack 550 to believe that there is a potentially vulnerable system responding. The attacker is thus lured into communicating with virtualized operating system module 506 and its virtualized decoy operating systems and services. Since real hardware is utilized, the attacker is essentially attacking an actual physical system and, therefore, cannot tell that the system is actually an instrumented honeypot that monitors the attacker activity 550 from the introspection module 538 described below.

As described above, the virtualized guest operating system module 506 includes the virtual machine-based rootkit module 520 and its associated userland processes 522. Since both the virtual machine-based rootkit module 520 and its associated userland processes 522 run completely outside the virtualized decoy operating systems 512, they remain hidden from the instigator of the attack, with no discoverable impact on the decoy operating systems' 512 performance. In one embodiment, the virtual machine-based rootkit module 520 and its associated userland processes 522 constitute an introspection module 538 (also known as a virtual machine-based memory introspection analysis tool) that monitors and introspects into the virtualized decoy operating systems' memory segments. This occurs from within the hypervisor operating system 510. The introspection module 538 introspects and gathers information on any virtualized operating system supported by the hypervisor operating system 510.

The introspection module 538 comprising the virtual-machine-based rootkit module 520 and its associated userland processes 522 examines the memory assigned to virtualized decoy operating systems 512 in order to acquire low-level data about the interaction between the decoy operating systems and attack activity 500. The introspection module 538 examines the memory of virtualized decoy operating systems 512 by means of three functional components: a code region selector, a trace instrumentor, and a trace analyzer. Regular expressions (also known as 'regex') are used throughout the process to identify, describe, and profile the contents of the virtualized decoy's memory segments. The code selector identifies regions of code in memory that are of interest for further introspection. Regions of interest may include, but are not limited to, system calls, the arguments of system calls, the returns of system calls, device and memory input-output, driver information, library calls, branching information, instruction pointer jumps, and raw network information. The instrumentor copies the memory traces of interest identified by the code selector and then profiles and instruments them. The trace analyzer takes the instrumented traces and uses them to replay the memory behavior of the decoy operating system 512. In this manner, the introspection module 538 examines the contents of the decoy operating systems' 512 memory segments in an instrumented context that generates and retrieves forensic data for analysis by the processing module 508.

When an attacker connects to a network port and begins interacting with a virtualized decoy operating system 512, the introspection module 538 monitors and captures information from the connection, including port numbers, data streams, file uploads, keystrokes, ASCII or binary files, malicious payloads, memory manipulation attempts, and any other data transfers or malicious attempts.

The captured information, containing attack-identifying information, is then sent from the introspection module 538 to the processing module 508 by means of a virtual machine-based rootkit userland process 522.

The processing module 508 includes an operating system kernel 526, which in some embodiments is also LINUX based. The processing module 508 also includes a database, such as a relational database server 528, and a signature-generation engine 530. In some embodiments, the signature-generation engine 530 communicates with the introspection module 538 over a private network interface communications channel 534 and accepts custom-formatted protocol packets named BAT (Blade Activity Transfer). The private network interface communications channel 524 may be a persistent Layer 3 TCP socket communications link that cannot be seen or accessed by the attacker (such as an IP connection or any other hardware-dependent custom communication protocol known to persons skilled in the art). Thus, the processing module 508 is part of a secure and separate administrative network.

In use, the introspection module 538 captures (through introspection) attack information. The attack information is then communicated through the private network interface channel 524 and stored on the relational database server 528 as forensic data for later analysis. The signature-generation engine 530 then uses this forensic data to generate a signature of the attack. The entire process from attack detection through signature generation may occur automatically, i.e., without any human intervention, at a timescale ranging from nearly immediate to several minutes. The intrusion prevention system (described below) uses the attack signature to identify and prevent subsequent attacks.

The protected computer network 504 includes an IDS/IPS library of signatures 534 and an IDS/IPS system 542 coupled to multiple protected network devices 536. Suitable IDS/IPS systems 542 include Cisco Systems' IPS 4200 Series, Juniper's IDP 200, and Enterasys' Dragon IDS Network Sensor.

In one or more embodiments, the signature may be sent from the back-end processing module 508 to the intrusion detection and/or prevention (IDS/IPS) signature library 534 through a second network connection 540, which is used by the processing module 508 to directly interact with the IDS/IPS system 542. The virtual-machine-based rootkit module 520 may easily clean the virtualized decoy operating system 512 at any time by removing the running system image of the compromised virtualized decoy operating system and replacing it with a pre-attack system image. Thus the virtual-machine-based rootkit module 520 can cleanse or reset the virtualized decoy operating system of any malicious software or payload, removing the possibility that attacker(s) can use that virtualized decoy operating system 512 for further attacks on other networks. In this manner, the attack can be thwarted, and the operating system does not become a tool of the attacker(s). This procedure may also be automated, i.e., may occur without further human intervention.

As shown in FIG. 2, processing starts at Step 200 and waits for activity from the introspection module 538 at Step 43. At Step 44, the processing module 508 generates a report of the attack that includes attack-identifying information (See FIG. 3). This report is for review and use by a system administrator responsible for the security of a protected network 504. The attack may contain, but is not limited to, one or more data transfers or keystrokes, which are analyzed at Step 46. By observing whether the attacker is successful in interacting with the system (i.e., if the system is responding in a manner that shows that the attacker has gained access), a determination can be made at Step 48 as to whether an attack signature should be generated, and the attack signature is created at step 52 (See FIG. 4). If the attacker, for example, is unsuccessful at gaining access, or if there is no data transfer, the attack inquiry may be ended at Step 50. Any attack signature generated is sent to the IDS/IPS signature library 534 at Step 56, and processing continues at Step 43.

In one embodiment of the invention, the report of the attack is written and then displayed via a visualization interface 532 and can include information about which sockets were accessed by the attack 550, what happened at a particular socket, the keystrokes entered or data transferred, what files were transferred, how the attack 550 was run, what happened on the virtualized operating system module 506, and how the virtualized decoy operating systems 512 running on the hypervisor operating system 510 and any related network services were affected. In some embodiments, the visualization interface 532 is AJAX- and/or FLASH-based. The report may also include information on the location of the instigator of the attack 550 or the service provider used for the attack. Graphical representations of key information and interactive mapping of attack locales by region or country may also be included in the report. The visualization interface may also be used to analyze, configure, and automate the system's response to attack activity 550 on timescales ranging from near-immediate to several minutes from the initiation of an attack.

At Step 46, the attack-identifying information is analyzed for known attack patterns as well as non-standard patterns, such as repeating binary patterns, keystroke patterns, downloaded daemons, or errors (such as buffer overflow attempts, malicious payloads attempting to execute arbitrary code on the system, memory overwriting attempts, stack attacks, and heap attacks). By observing the operations performed on the decoy operating system(s) 512, the attack 550 may be categorized and analyzed to determine, for example, how an attack gained control of the decoy operating system(s) 512. Any method of analyzing the incoming data such as binary matching, neural-network matching, keyword matching, or any other method of matching attack-identifying information is in keeping with the spirit of the invention. Pattern-matching techniques involving neural networks, for example, are characterized in Carl Looney's *Pattern Recognition Using Neural Networks: Theory and Algorithms for Engineers and Scientists* (Oxford University Press USA, New York, N.Y., 1997) and Christopher Bishop's *Neural Networks for Pattern Recognition* (Oxford University Press USA, New York, N.Y., 1995), among other sources familiar to those skilled in the art.

At Step 48, a decision is made as to whether to generate an attack signature. If no harmful operations occurred as a result of an attack, or when no known attack patterns are found, then no further attack inquiry would be needed (as shown at Step 50). The processing module 508 may then take on the next input of captured information from the introspection module 538 running on the hardware-based, virtualized operating system module 506.

If a determination is made that attack signature generation is warranted, an attack signature is generated as illustrated in Step 52. In one or more embodiments of the invention, the processing module 508 may generate a signature whenever data is found to be transferred through the socket. Alternatively, if the attack signature already exists, or if the data transfer is of a nature that indicates probing rather than attack, then the attack signature may not be generated. For example, the processing module 508 may not generate a signature when it is found that no data has been transferred through the socket, even though the socket may have been opened and closed. The conditions under which the processing module 508 generates an attack can be configured and automated by an administrator. Once the attack signature is generated, the signature can be reviewed by the system administrator, who decides whether to send the attack signature (shown at Step 56) to the intrusion detection system (IDS) or intrusion prevention system (IPS) for the protected network 504. The attack signature is sent through a standard network connection or via a wireless connection and is generally sent on a private portion of the protected network 504 that the attacker cannot observe. The generated attack signature is thus applied to the IDS/IPS library of signatures 534, thereby updating the information contained in the signature library and preventing the attacker from accessing the protected network 504.

Embodiments of the invention may save the attack signatures created at Step 52 in a relational database server 528 for future use or analysis by system administrators. The signatures may also be sent to a proprietary global database of attack signatures for further analysis, storage, and distribution. Any IDS/IPS system may be utilized in one or more embodiments of the invention. The invention may be interfaced with existing IDS/IPS systems, for example to integrate it with existing solutions.

As explained above, FIG. 3 illustrates a human-readable summary of an example attack. Line 300 shows that the file "msprexe.exe" is copied into the "System" directory. Line 301 shows a first registry entry created by the attack. Line 302 shows a second registry entry created by the attack. Any other changes to the system may be shown as part of the attack-identifying information, and the information shown in FIG. 3 is exemplary only.

As explained above, FIG. 4 illustrates an attack signature generated from the attack summarized in FIG. 3 and formatted in XML for transmission to an IDS or IPS. XML Block 400 includes tags that define the attack signature in the format of the particular IDS or IPS. Any tags used by any IDS or IPS are in keeping with the spirit of the invention, and the tags shown in FIG. 4 are exemplary only. For example, any ports, protocols, severity levels, alarm levels, signature name, or any other quantity, may be utilized to inform an IDS or IPS of an attack signature.

While embodiments and alternatives have been disclosed and discussed, the invention herein is not limited to the particular disclosed embodiments or alternatives but encompasses the full breadth and scope of the invention including equivalents, and the invention is not limited except as set forth in and encompassed by the full breadth and scope of the claims herein.

What is claimed is:

1. A computer system, comprising:
   one or more processors, and
   memory storing one or more programs for execution by the one or more processors, the one or more programs including:
      a first fully-functional operating system configured to provide real information of the fully-functional operating system in response to an external scan; and
      a monitoring module that (A) is coupled with the first operating system and hidden from an attacker attacking the first operating system, (B) monitors activities in the first operating system, (C) captures data including attack-identifying information based on the activities in the first operating system, and (D) provides captured data including the attack-identifying information to an information processing system that includes an operating system that is separate and distinct from the one or more operating systems of the computer system, wherein the information processing system is configured to generate an attack signature by analyzing the captured data, wherein the monitoring module includes a kernel module that monitors activities in the first operating system, and the kernel module is not included in a kernel module listing of the first operating system and kernel pointers for the kernel module are removed so that the kernel module is hidden from the attacker attacking the first operating system.

2. The computer system of claim 1, wherein the one or more programs include:
   a second operating system that is a hypervisor operating system, wherein:
      the first operating system is a virtualized operating system;
      the monitoring module is located outside the first operating system and inside the second operating system, thereby remaining hidden from the attacker attacking the first operating system; and
      the monitoring module is configured to monitor memory segments of the first operating system.

3. The computer system of claim 1, wherein the monitoring module is configured to monitor services running on the first operating system.

4. The computer system of claim 3, wherein the information processing system is configured to apply the attack signature to a library of signatures contained in an intrusion prevention system, that is separate and distinct from the computer system, to control access to the computer system.

5. The computer system of claim 1, wherein the computer system and the information processing system are connected through a secure communication channel that is hidden from and inaccessible by the attacker attacking the first operating system.

6. The computer system of claim 5, wherein the secure communication channel is a private network interface communications channel.

7. The computer system of claim 1, wherein the monitoring module is configured to open one or more ports of the first operating system prior to monitoring the activities in the first operating system.

8. The computer system of claim 1, wherein the information processing system is configured to generate an attack signature by analyzing the captured data in accordance with a determination that the attacker has gained access to the first operating system.

9. The computer system of claim 1, wherein the monitoring module includes rootkit code configured for hiding the monitoring module from the attacker.

* * * * *